United States Patent
Kanevsky et al.

(10) Patent No.: US 7,295,904 B2
(45) Date of Patent: Nov. 13, 2007

(54) TOUCH GESTURE BASED INTERFACE FOR MOTOR VEHICLE

(75) Inventors: Dimitri Kanevsky, Ossining, NY (US);
Roberto Sicconi, Ridgefield, CT (US);
Mahesh Viswanathan, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 462 days.

(21) Appl. No.: 10/930,225

(22) Filed: Aug. 31, 2004

(65) Prior Publication Data

US 2006/0047386 A1    Mar. 2, 2006

(51) Int. Cl.
G09G 5/00 (2006.01)
G06K 9/00 (2006.01)
G06F 3/00 (2006.01)

(52) U.S. Cl. .............................. 701/36; 701/1; 701/36; 701/49; 345/173; 704/275

(58) Field of Classification Search .................... 701/1, 701/36, 49, 41; 345/173, 156; 340/426.35; 704/275; 382/103, 104
See application file for complete search history.

(56) References Cited

U.S. PATENT DOCUMENTS 5,809,267 A * 9/1998 Moran et al. ............... 715/863
6,111,580 A * 8/2000 Kazama et al. ............. 715/863
6,703,999 B1 * 3/2004 Iwanami et al. ............ 345/158
7,158,871 B1 * 1/2007 Ilan et al. ..................... 701/49
2002/0135618 A1 9/2002 Maes et al.

FOREIGN PATENT DOCUMENTS

| EP | 0813989 A1 | 12/1997 |
|---|---|---|
| GB | 2355055 A | 4/2001 |
| WO | WO 99/57648 | 11/1999 |
| WO | WO 01/45080 A1 | 6/2001 |
| WO | WO 01/60650 A1 | 8/2001 |

* cited by examiner

*Primary Examiner*—Tan Q. Nguyen
(74) *Attorney, Agent, or Firm*—Duke W. Yee; Anne V. Daugherty; James O. Skarsten

(57) ABSTRACT

An improved apparatus and method is provided for operating devices and systems in a motor vehicle, while at the same time reducing vehicle operator distractions. One or more touch sensitive pads are mounted on the steering wheel of the motor vehicle, and the vehicle operator touches the pads in a pre-specified synchronized pattern, to perform functions such as controlling operation of the radio or adjusting a window. At least some of the touch patterns used to generate different commands may be selected by the vehicle operator. Usefully, the system of touch pad sensors and the signals generated thereby are integrated with speech recognition and/or facial gesture recognition systems, so that commands may be generated by synchronized multi-mode inputs.

34 Claims, 4 Drawing Sheets

TOUCH GESTURE BASED INTERFACE FOR MOTOR VEHICLE

BACKGROUND OF THE INVENTION

1. Technical Field

The present invention generally pertains to an improved system or interface for operating multiple devices in a motor vehicle, while reducing driver distraction. More particularly, the invention is directed to an interface of the above type wherein the driver generates a pattern of synchronized signals, which may be pre-selected by the driver himself, to command one of the devices to perform a specified operation. Even more particularly, the invention is directed to an interface of the above type wherein the pattern of signals may be generated by either a single means, or by different multi-mode means.

2. Description of Related Art

At present, most control systems in a car require physical movement, such as pushing a button or moving a switch on a dashboard. Actions of these kinds are typically required, for example, to turn on a radio, open a window or turn on an air conditioning system. However, such actions tend to decrease a driver's attention to traffic and road conditions, and may even create a hazardous situation. Some states, for example, have now prohibited use of hand held cellular phones.

Recently, speech recognition and voice command systems have been developed, in an attempt to alleviate the amount of physical interaction and driver distraction that can occur in automobiles due to the use of controls that require physical movement. However, speech recognition systems have been found to have certain faults and disadvantages. For example, if a driver fails to execute words or commands accurately, a speech recognition system will not operate properly. This could in fact increase driver distraction, if a mistake is made in interpreting a driver's commands. Moreover, a driver may need to remember a large number of commands, in order to operate speech recognition systems in a car. For example, there are numerous ways to state the command "make it warmer by ten degrees". However, standard voice command understanding systems usually understand only several of the most basic ways to pronounce commands of this type. Using speech recognition with understanding systems, that allow a person to speak commands naturally, provides a solution in principle, but such systems have generally not yet been implemented. It is anticipated that implementation is still many years away, due to inherent scientific difficulties in creating such systems. As a further disadvantage, voice command systems may be disturbing, such as to sleeping passengers or others, in the limited space of a motor vehicle.

SUMMARY OF THE INVENTION

To overcome disadvantages and drawbacks of the prior art, such as those described above, embodiments of the invention provide for one or more touch sensors or touch sensitive pads, or discs, (referred to hereinafter as touch pads or touch pad devices) to be mounted on the steering wheel of a motor vehicle. The vehicle operator touches the pads in a pre-specified synchronized pattern or manner, to command performance of a corresponding function such as turning on the radio, lowering or raising radio volume or opening or closing a window. Embodiments of the invention can be used to operate numerous other systems and devices, including all those referred to herein, without being limited thereto. In very useful embodiments of the invention, the vehicle operator himself/herself is able to select touch patterns that will be used to respectively generate different commands.

Embodiments of the invention may also integrate the system of touch pad sensors and the signals generated thereby with speech recognition and/or facial gesture recognition systems, so that commands are generated by synchronized multi-mode inputs. For example, the operator, before operating the touch pad system, could state "I am giving a command", or could make a prespecified facial gesture. The combined voice and touch commands could also be used to operate a series of functions. Thus, a voice command could be used to turn on the radio, and a touch command could then be used to indicate radio volume.

In a further embodiment, the system could provide feedback to the vehicle operator after the operator has executed a command, to acknowledge receipt of the command or to ask for confirmation. Feedback could, for example, be provided by a recorded voice or other audio means, by lights or by a vibrator.

As used herein, the term "touch gesture" is intended to mean any type of touch, stroke, press or tap imparted to a touch pad, or other touch sensitive device, by means of a user's hand, finger, or other body part, or by means of a stylus or other instrument.

As used herein, the term "synchronized signals" is intended to mean signals that occur in a pre-specified relationship, such as in a prescribed sequence and within a specified time window.

One embodiment of the invention provides apparatus for selectively controlling one or more devices or systems contained in or included with a motor vehicle driven by a vehicle operator. The apparatus comprises one or more touch pad devices respectively mounted to receive a specified touch gesture pattern from the operator while the vehicle is being driven, the touch pad devices being responsive to the received touch gesture pattern to generate a corresponding pattern of touch pad signals. The apparatus further comprises an interpretation module adapted to recognize that the pattern of touch pad signals is associated with a pre-specified command for selectively operating a particular one of the systems. An execution module is disposed to receive the pre-specified command from the interpretation module, and to operate a particular system in accordance with a pre-specified command.

In a further embodiment of the invention, a training module is connected to the interpretation module for use by the operator to enter selected touch gesture patterns, and the commands respectively associated therewith, into the interpretation module. Preferably, at least one device, having a mode of operation different from the operational mode of the touch pads, is provided for use by the operator to generate one or more multi-mode control signals. Such multi-mode devices may include both speech recognition and facial gesture recognition devices, disposed to respond to vocal instructions and to predefined facial gestures of the operator, respectively.

BRIEF DESCRIPTION OF THE DRAWINGS

The invention itself, as well as a preferred mode of use, further objectives and advantages thereof, will best be understood by reference to the following detailed description of an illustrative embodiment when read in conjunction with the accompanying drawings, wherein.

DETAILED DESCRIPTION OF AN EXEMPLARY EMBODIMENT

Telematics is the blending of computers and wireless telecommunications technologies, and can refer to automobile systems that make use of such technologies. With development of Telematics, more and more devices are becoming available for use in motor vehicles. These devices include, without limitation, telephones, radios, CD players, navigation systems, voice-based interactive games and information services. It is thus necessary to provide drivers with an enhanced ability to safely control a large number of new and different devices and functions, such as to change channels in a radio, dial a number in a cellular telephone, or to track a navigation system.

Figure 1:
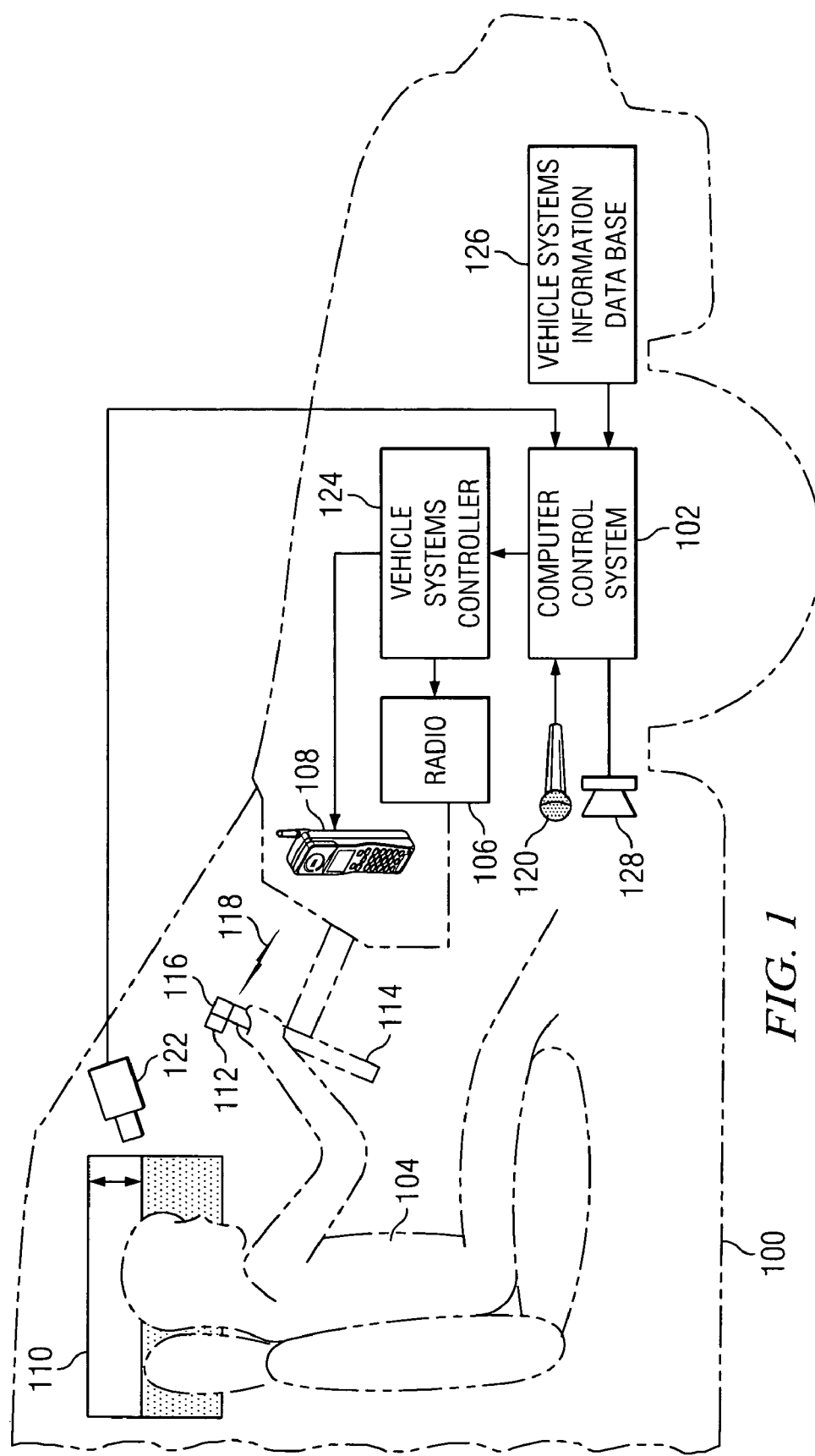
FIG. 1, is a schematic diagram showing an embodiment of the invention.

Referring to FIG. 1, there is shown a car or other motor vehicle 100 provided with a computer control system 102 for use in embodiments of the invention. By means of the embodiments, a driver or operator 104 of vehicle 100 is able to generate commands to operate, as desired, a number of different electronic, electrical and electromechnical devices and systems contained in or otherwise associated with vehicle 100. By way of example only, FIG. 1 shows some of such devices, including a radio 106, a wireless telephone 108 and an electrically powered window 110. Each of these devices, as well as a large number of other devices which will occur to those of skill in the art, may be readily controlled by embodiments of the invention as vehicle 100 is moving in traffic. At the same time, driver distraction away from the surrounding traffic and road conditions is significantly reduced.

To generate commands in accordance with the invention, one or more touch sensitive pads 112 are mounted on the steering wheel 114 of vehicle 100. Preferably, each touch pad 112 is mounted proximate to the vehicle operator's hands, as the operator grasps the wheel, so that the operator can easily and conveniently touch each sensor surface with his fingers or thumb. Accordingly, by applying different discrete patterns of synchronized touch gestures to the respective touch pads 112, the operator 104 can readily produce different respectively corresponding patterns of control signals. Control signals may be coupled to computer control 102 by means of a wireless link 118, by providing suitable RF transceivers (not shown) in the steering wheel 114 and computer 102. Alternatively, signals may be transmitted over a wired path such as a conductive or optic fiber path (not shown) extending between the touch pads 112 and computer control 102.

Referring further to FIG. 1, there is shown a microphone 120 positioned to receive vocal statements or speech from operator 104, and a video camera 122 positioned to readily view facial gestures of operator 104. The operator 104 can use one or both of these devices to provide further control signals, in addition to those generated using the touch panels 112. For example, the operator could make the statement "I am giving a command", or could make a pre-specified facial gesture, before operating the touch pads 112. The statements and facial gestures would be detected by microphone 120 and video camera 122, respectively, and corresponding signals would be coupled therefrom to computer control 102. Thus, the embodiment shown in FIG. 1 comprises a multi-mode system wherein different techniques may be used to generate synchronized control signals which are integrated to form discrete, clearly defined commands.

FIG. 1 further shows a vehicle systems controller 124, connected to receive commands from computer control system 102. Controller 124 responds to received commands by generating signals in a conventional manner to operate respective systems and devices in vehicle 100, such as to open or close window 110, or to operate radio 106 and phone 108. A vehicle systems information database 126 is also coupled to computer control system 102, to provide information thereto. This information may be furnished to the database 126 from an information system comprising a number of different sensors (not shown) positioned at selected locations in and around vehicle 100.

FIG. 1 further shows a speaker 128 within vehicle 100 for providing electronically generated statements, such as questions, prompts and the like, to assist the operator 104 in forming and generating commands.

It is to be understood that embodiments of the invention can also be used in connection with motorcycles, bicycles or other vehicles controlled by manipulating handlebars or handles rather than a steering wheel. In embodiments of this type, the touch pads would be mounted at the end of one or both handlebars to enable an operator to use the pads while continuing to grasp the handlebars.

Figure 2:
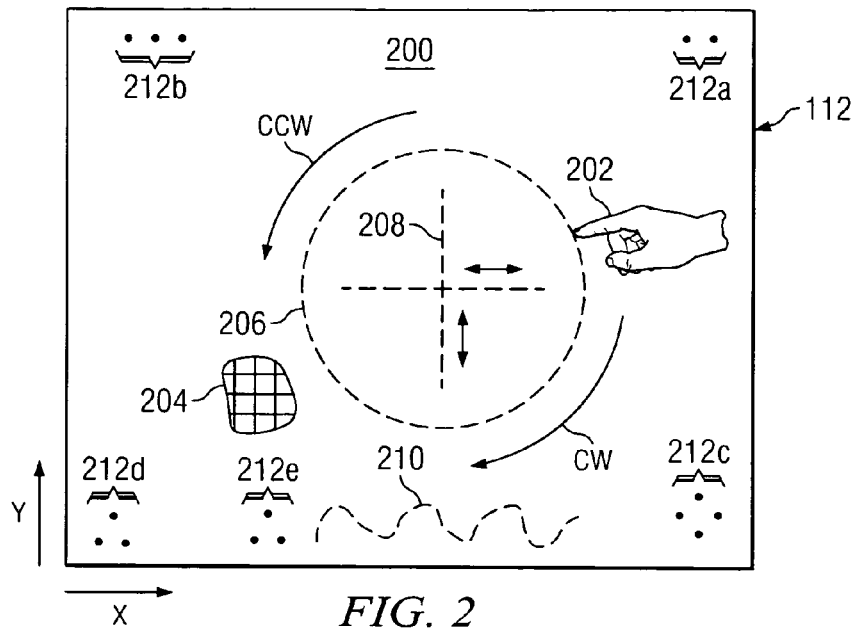
FIG. 2 is a schematic diagram showing a touch pad for use with the embodiment of FIG. 1.

Referring to FIG. 2, there is shown a touch pad device 112 having a touch sensitive surface 200 that is readily accessible to a finger 202 of vehicle operator 104. Usefully, touch pad 112 comprises one of a number of conventionally available devices that can distinguish between the locations of pressure points applied at different spatial positions on sensor surface 200. For example, surface 200 may comprise a number of small surface elements 204, each uniquely identified by its coordinate positions with respect to X and Y axes. When a point of pressure is applied to a particular surface element 204, by means of an object such as a finger, stylus or the like, touch pad 112 will generate a signal uniquely corresponding to the particular surface element. The signal thus identifies the location of the pressure point. An example of a device of this type would be a device commercially known as Track Point, manufactured by the International Business Machines Corporation.

It will be seen that if finger 202 moves in a circular pattern 206 over the sensor surface 200, a pattern of signals will be generated that identify each of the surface elements successively contacted by finger 202. It will be seen further that by monitoring and conventionally processing this pattern of signals, computer control 102 will be able to readily recognize that the motion of finger 202 along path 206 is circular motion. Moreover, the computer control will be able to recognize that the circular motion is either clockwise or counter-clockwise. Thus, both types of circular motion can be used by an operator 104, to easily generate two different, readily detectable, instructions or signals.

FIG. 2 further shows a cross pattern 208 that can likewise be easily formed on sensor surface 200, and then be readily recognized as a distinct inputted instruction. Linear motion, in both horizontal and vertical directions, as well as a wave pattern 210, can also be used to provide simple and readily recognized inputs.

Referring further to FIG. 2, there are shown configurations of small, tactile bumps or projections 212 a-e, at different locations on sensor surface 200. The respective configurations are provided to enable a user to locate by feel different positions on sensor surface 200. In one application, the user could use the first and second fingers of one hand to simultaneously apply pressure at the sensor surface locations respectively identified by triangular projection configurations 212d and 212e. This would provide a further simple and well defined operator input using the touch pad 112.

Touch pad sensors 112 may also be used in embodiments of the invention that respond to variations in pressure applied to a point on the sensor surface, or that respond to variations in time duration of applied pressure. Thus, the pressure applied to a touch pad having these features could be selectively varied to adjust radio volume or the like.

Figure 3:
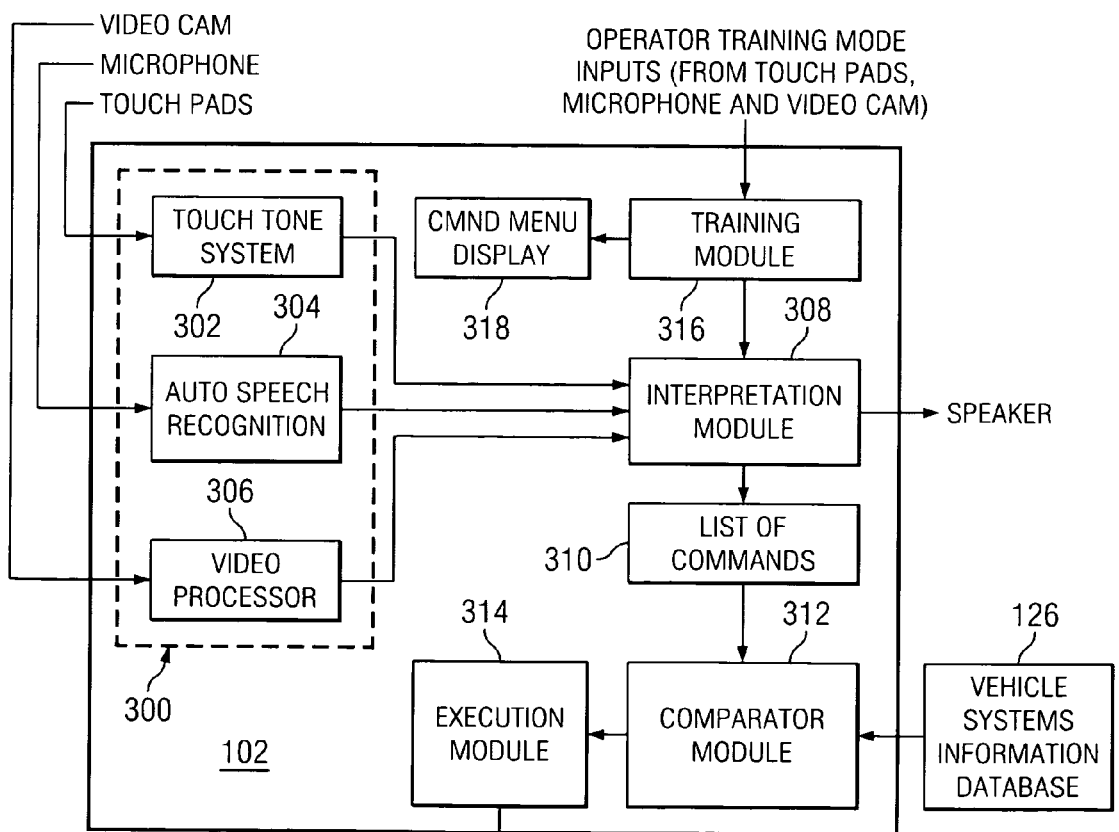
FIG. 3 is a block diagram showing a computer control system for the embodiment of FIG. 1.

Referring to FIG. 3, there is shown computer control system 102 provided with a communication module 300. Communication module 300 contains a touch tone system component 302 configured to receive and process the signals produced by touch pads 112, in response to respective touch gestures applied thereto. Thus, if touch tone system component 302 receives a signal pattern indicating a clockwise circular motion applied to a particular touch pad 112, a signal encoding this information is coupled from touch tone system 302 to an interpretation module 308, also provided in computer control system 102. Alternatively, the touch tone system 302 may detect a particular synchronized pattern of signals provided by two different touch pads 112. Generally, signals from two different touch pads 112 are synchronized if they occur in a pre-specified relationship, such as simultaneously, or in a prescribed sequence and within a specified time window of one another.

FIG. 3 further shows communication module 300 provided with an automatic speech recognition component 304, receiving audio signals from microphone 120, and a video processor 306 receiving signals from video camera 122. Speech recognition component 304 is operable to convert detected speech of the operator into text, and to couple signals that encode the text to interpretation module 308. Video processor 306 is operable to detect a particular facial gesture of the operator, such as a wink or single eye movement. For example, video processor 306 could compare a detected facial view of operator 104 with respective views stored in a database, until a match is found. A signal representing the detected facial gesture is then likewise coupled to interpretation module 308.

Interpretation module 308 is configured to interpret the information collectively provided by the touch pad signals and the speech and facial gestures of the operator. Module 308 creates a list of all commands that computer control system 102 can generate to operate various systems in vehicle 100, such as to open a window or turn on a radio. Interpretation module 308 combines the touch pad, speech and facial gesture information, and then selects a command from the list of commands 310 that is represented by the combination. Thus, interpretation module 308 serves as an integration system for speech, touch pad and facial gesture signals. A related integration system is described, for example, in U.S. Pat. No. 6,421,453, filed May 15, 1998 and entitled "Apparatus and Methods for User Recognition Employing Behavioral Passwords", incorporated herein by reference.

Referring further to FIG. 3, there is shown a comparator module 312 receiving selected commands from interpretation module 308 and list 310. In addition, comparator module 312 receives vehicle systems information from database 126. The comparator module compares a selected command with the current status of the pertinent vehicle system, in order to reduce error. For example, if the command is a direction to close window 110, comparator module 312 should determine from the database 126 whether the window is in an open or closed condition. If the window is open, a command to close the window would be valid, whereupon comparator module 312 would route the command to execution module 314. Module 314 is generally responsible for executing respective commands after their interpretation. Module 314 arranges for control signals to be sent to respective vehicle systems and devices, to control operation thereof in accordance with respective commands received by module 314.

As an important feature, FIG. 3 shows computer control system 102 further provided with a training module 316, coupled to interpretation module 308. Training module 316 is adapted for use by an operator of vehicle 100, to enable the operator to select a particular pattern of touch pad gestures to define a command, possibly in combination with a selected vocal statement or facial gesture. The training module has an associated display 318 for displaying all possible commands. Thus, an operator using the training module 316 could select a command shown by the display. Using the touch pads 112, the operator would then enter a touch gesture pattern, or combination of synchronized touch gestures, to define the selected commands. Microphone 120 and video camera 122 would be used to enter respective associated statements and/or facial gestures, if desired. Training module 316 would also be used to enter the new command into the list of commands 310.

Figure 4:
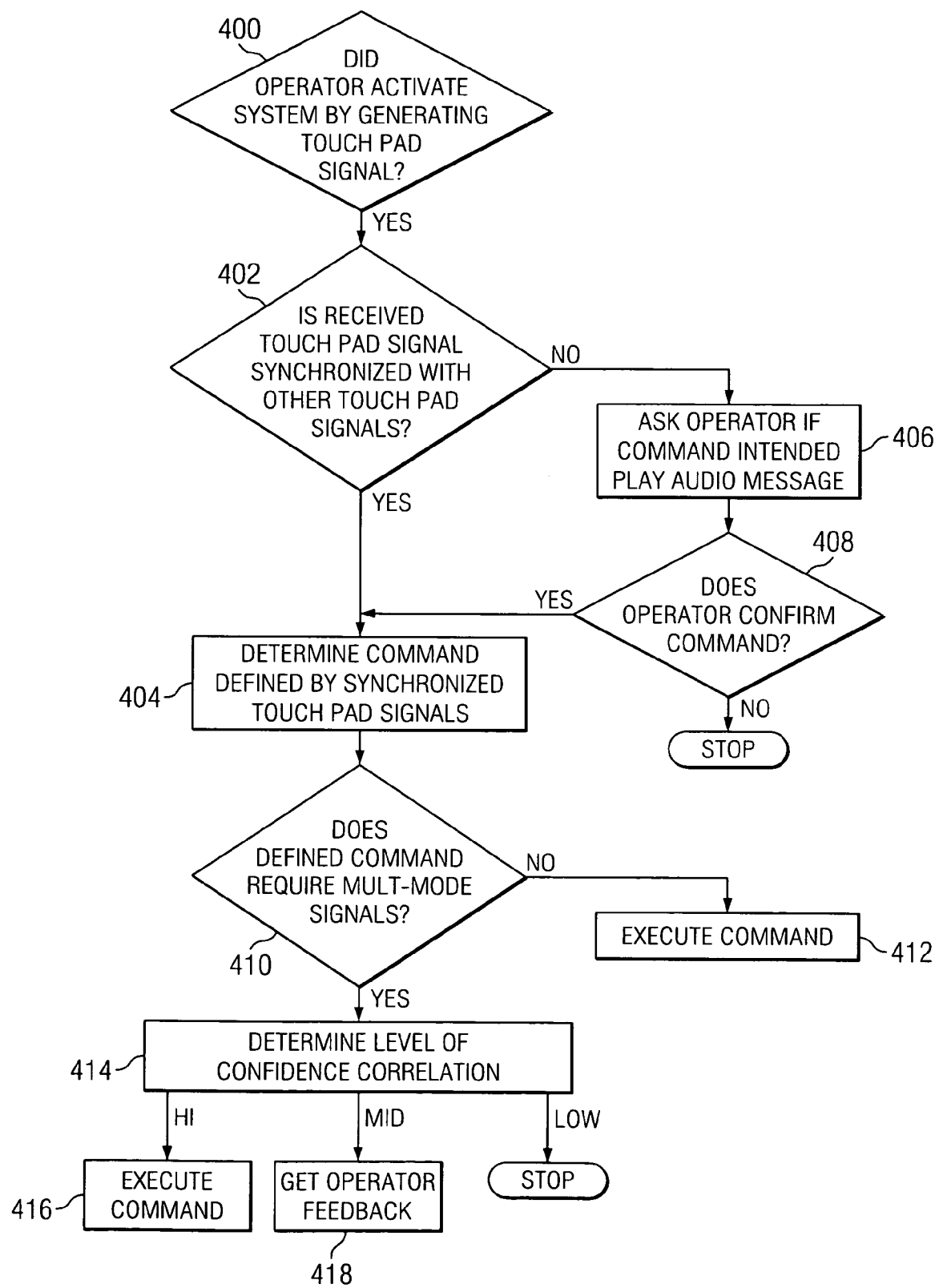
FIG. 4 is a flow chart illustrating a mode of operation of the embodiment of FIG. 1.

As described above, interpretation module 308 is configured to receive multiple signals from communication module 300, and to identify or determine the particular command that is intended by the multiplicity of signals. These signals are generated by different actions of the vehicle operator, possibly using different touch pads, while the vehicle is in operation. Clearly, some touches applied to the touch pads will be inadvertent. Other signals are based on speech and facial recognition, and the recognition procedures, at present, generally require some margin for error. Accordingly, interpretation module 308 is further configured, as shown by FIG. 4, to assess the level of certainty that signals received from communication module 300 do, in fact, define an intended command.

It will be appreciated that "extreme" situations can suddenly and unexpectedly occur in the operation of a motor vehicle, whereupon the operator may sharply apply his brakes or rapidly turn the steering wheel in an attempt to change direction. In performing actions of this type, the operator could unintentionally produce gestures that appeared to be commands, as described above, but are not. Accordingly, it would be desirable, to provide the control system with the capability to recognize that an extreme situation has occurred. The system could then disregard any further commands, until positively informed that the extreme situation had ended. The technology for detecting specific extreme situations, such as rapidly applying brakes, is well developed. A device of this type could, for example, be included as one of the vehicle systems providing information to database 126.

Frequently, different vehicle operators will use detectably different touch gestures to generate a particular command.

For example, a wife who uses a car may apply a much gentler touch to a touch pad than her husband, who may also use the car. Accordingly, gesture identification of an operator may be performed at the beginning of a driving session, using a known history and profile of persons who are allowed to drive the car. Characteristic gesture information for such persons could be pre-entered into system 102. The technology for identification of users by means of gestures is similar to currently available user identification technologies. Technologies of this type are described in U.S. Pat. No. 6,421,453, referred to above, and include voice print, fingerprint, face recognition and gesture recognition.

Referring to FIG. 4, block 400 shows interpretation module 308 responsive to a signal received from touch tone system 302 indicating that the vehicle operator has operated one of the touch pads to generate a touch pad signal. As shown by function block 402, interpretation module 308 determines whether the received touch pad signal is synchronized, as defined above, with one or another received touch pad signals. If so, as shown by function block 404, the interpretation module determines the command from command list 310 that is specified or defined by the particular synchronized signals.

If the received touch pad signal is not found to be synchronized with other touch pad signals, either because there is no other received touch pad signal or because two received signals did not occur in the correct sequence or time window to specify a command, function block 406 becomes operative. That is, the operator is queried as to whether he intended to generate a command. This is usefully done by sending an audio message from interpretation module 308 to the operator, by means of speaker 128. As shown by function block 408, if the operator does not confirm an intent to execute a command, interpretation module 308 halts further action in regard to the received touch pad signal. If the operator does confirm an intent to execute a command, the intended command is routed to function block 404.

Referring further to FIG. 4, after a command that is defined by or associated with the received touch pad signals has been identified, it is necessary to determine whether the defined command is further defined by or associated with any multi-mode signals. This is shown by function block 410. Multi-mode signals would be speech or facial gesture signals provided by speech recognition component 304 or video processor 306, respectively. If the defined command has no multi-mode signals associated with it, the command is executed, as shown by function block 412.

If the defined command has an associated multi-mode signal, a level of confidence correlation of the signal must be determined, as indicated by function block 414. More particularly, speech recognition component 304, shown in FIG. 3, may not be sure that it understands a voice command. Accordingly, it assigns a confidence correlation score to its interpretation of the voice command. The correlation score may be low, high, or mid range. Similarly, video processor 306 provides low, high, and mid range scores, to indicate the confidence it has in the accuracy of its interpretation of a facial gesture.

Referring further to FIG. 4, function block 414 shows that if the confidence correlation score for a multi-mode signal is low, no further action is taken. If the correlation score is high, the associated command is executed, as shown by function block 416. If the score is at mid-range, operator feedback is sought, in accordance with function block 406 and 408.

Figure 5:
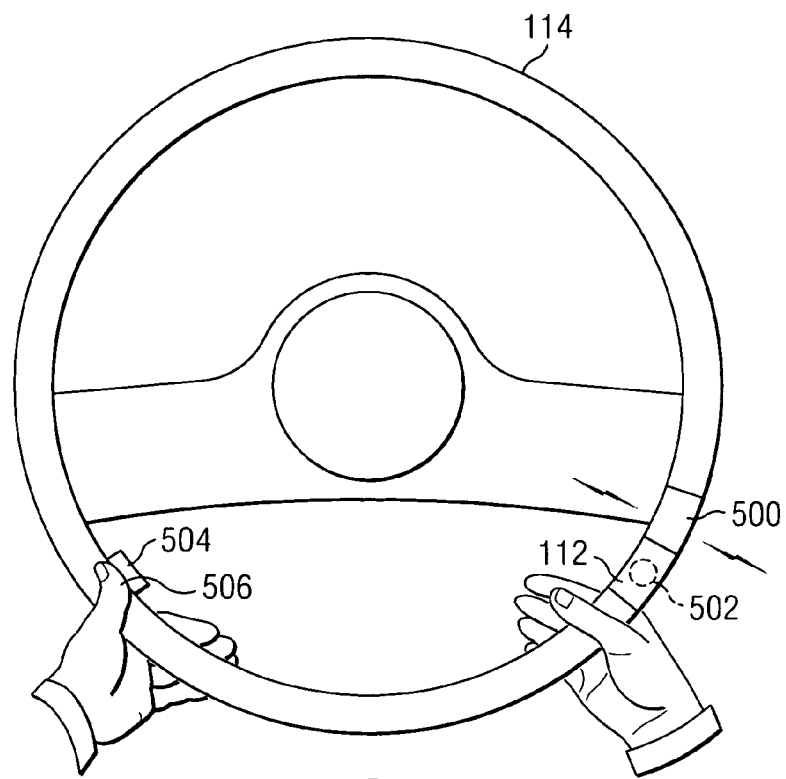
FIG. 5 is a schematic diagram showing components mounted on a steering wheel for the embodiment of FIG. 1.

Referring to FIG. 5, there is shown a touch pad 112 mounted on steering wheel 114, with a vibrator 500 mounted adjacent thereto. As a useful feature, vibrator 500 provides a vibration to the operator's hand, after the operator has completed entering a command. The operator is thus provided a feedback signal, confirming that the system has received the entered command.

Alternatively, a vibrator 502 could be used, which is placed underneath the touch pad 112. By placing the vibrators underneath the touch pads, the operator can be provided with force-feedback by short vibration or pulses, to confirm recognition of finger actions (presses and gestures).

As a further alternative, the feedback signal to the operator could be a vocal statement produced by speaker 128, or it could be a visual indicator feedback. For example, a small flashing light signal on the windshield could be provided to confirm a command. Moreover, when a prototype of a heads-up display (HUD) becomes available, it will be feasible to explore visual feedback in front of the eyes, while looking at the road ahead. At present, HUDs only use the outside border of the display, to avoid cluttering the view where the action is. However, the central part can be used to show invisible objects where they are, like an infrared (IR) picture of a deer hidden ahead. In this case, visual augmentation is provided through IR cameras. In an embodiment of the invention, it could be useful to use simple icons or textual information flashing only briefly in front of the driver to provide feedback to the touch pad gestures, and only when the driver is using them, in order to let him decide when to leave the display unobtrused.

Referring further to FIG. 5, there is shown a touch pad 504 having a sensor surface 506 that is easily reachable by an operator's thumb. Accordingly, the operator can perform touch gestures while leaving both hands on the steering wheel (hence position on the left and right sides of the central part of the steering wheel).

In a further embodiment, a small scratch pad on the touch sensor surface is an "iconic" mapping of what is on the dashboard. At the top level the user may use the scratch pad to invoke one of many applications available on the dashboard touch screen. The resolution of the scratch pad is dynamic, based on the state of the system. If the dashboard screen is zoomed in (detected by the pressure and duration of pressure applied in a particular spot of the scratch pad) then the resolution of the scratch pad is smaller. If the dashboard screen is zoomed out, such as to the top level, then the small stroke on the scratch pad can cover a unit area on the dash screen.

Figure 6:
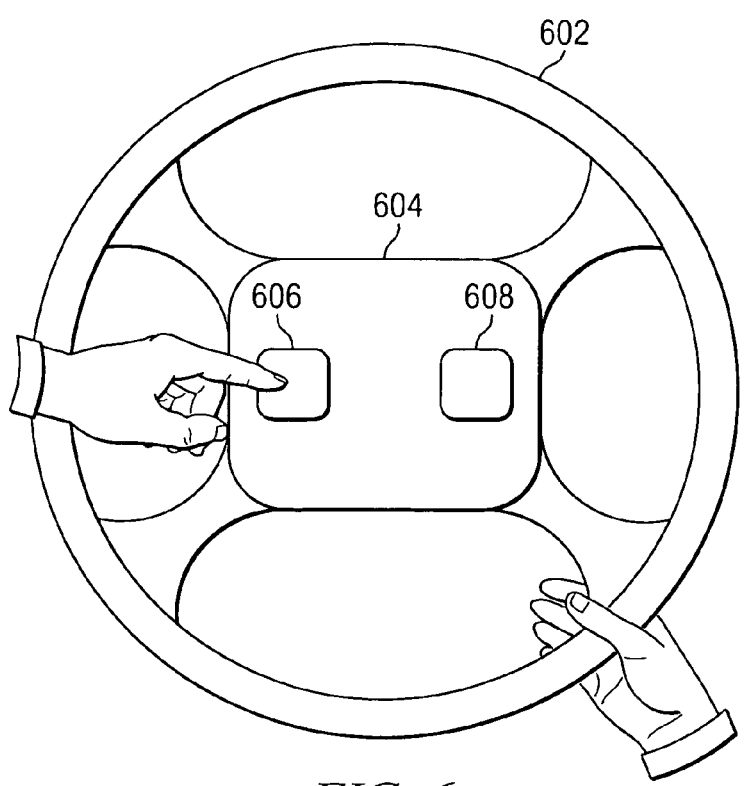
FIG. 6 is a schematic diagram showing a modified mounting arrangement for the embodiment of FIG. 1.

Referring to FIG. 6, there is shown a steering wheel 602 having a box structure 604, for containing an airbag or the like. In a further embodiment of the invention, touch pads 606 and 608 are mounted on the box 604, at the left and right borders thereof, respectively. Thus, the touch pads may be reached easily by the thumbs of the user, while the remaining fingers of the user continue to firmly hold the outer ring of the steering wheel. Usefully, the touch pads have rectangular touch surfaces on the order of 1½" by 2".

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. Apparatus for selectively controlling one or more systems included with a motor vehicle driven by a vehicle operator, said apparatus comprising:
   one or more touch pad devices respectively mounted to receive a specified touch gesture pattern from said operator while said vehicle is being driven, said touch pad devices responsive to said received touch gesture pattern to generate a corresponding pattern of touch pad signals;
   an interpretation module adapted to recognize that said corresponding pattern of touch pad signals is associated with a pre-specified command for selectively operating a particular one of said systems;
   an execution module disposed to receive said pre-specified command from said interpretation module, and to operate said particular system in accordance with said pre-specified command; and
   means for detecting occurrences of an extreme situation and for causing said execution module to disregard any commands until said apparatus is positively informed that said extreme situation has ended.

2. The apparatus of claim 1, wherein:
   said extreme situation is indicated by the occurrence of one of a number of pre-specified actions of said operator, wherein said pre-specified actions include, at least, rapidly applying the brakes and rapidly turning the steering wheel of said vehicle, selectively.

3. The apparatus of claim 1, wherein:
   at least one device having a mode of operation different from the mode of operation of said touch pad devices is provided for use by said operator to generate one or more multi-mode signals; and
   said interpretation module is disposed to route said pre-specified command to said execution module upon receiving both said corresponding pattern of touch pad signals, and a specified one of said multi-mode signals.

4. The apparatus of claim 3, wherein:
   said apparatus includes a speech recognition device disposed to encode a spoken instruction of said operator in a signal, in order to provide one of said multi-mode signals.

5. The apparatus of claim 4, wherein:
   said apparatus further includes a facial gesture recognition device disposed to analyze a viewed facial gesture of said operator, and to encode the analyzed facial gesture in a signal to provide another of said multi-mode signals.

6. The apparatus of claim 5, wherein:
   said speech and facial gesture recognition devices respectively provide confidence correlation scores of low, mid range or high value for each of said multi-mode signals.

7. The apparatus of claim 6, wherein:
   said interpretation module stops further action to execute a command associated with a multi-mode signal of low correlation score, arranges for execution of a command associated with a multi-mode signal of high correlation score, and requests the operator to confirm a command associated with a mid range correlation score.

8. The apparatus of claim 1, wherein:
   at least two of said touch pad devices are mounted on the steering wheel of said vehicle to collectively receive a pre-specified pattern of synchronized touch gestures from said operator.

9. The apparatus of claim 8, wherein:
   each touch pad is provided with a touch sensitive surface.

10. The apparatus of claim 9 wherein:
    said pattern of synchronized touch gestures is produced by touching each of said touch pads in a specified sequence during a specified time window.

11. The apparatus of claim 9, wherein:
    said touch gesture pattern is produced at least in part by moving a selected object along a specified path in contact with the touch sensitive surface of one of said touch pads.

12. The apparatus of claim 9, wherein:
    tactile reference indicia are placed at pre-specified locations on at least one of said touch sensitive surfaces.

13. The apparatus of claim 9, wherein:
    said touch gesture pattern is produced at least in part by enabling said operator to simultaneously apply pressure at two spatially separated locations on one of said touch sensitive surfaces, using two different fingers.

14. The apparatus of claim 9, wherein:
    each of said touch pads is mounted to receive touch gestures from a thumb of said operator while said operator continues to hold said steering wheel.

15. The apparatus of claim 1, wherein:
    said apparatus includes a feedback device coupled to said interpretation module for requesting that said operator confirm an intent to generate and execute one of said commands.

16. The apparatus of claim 15, wherein:
    said feedback device is disposed to electronically generate a vocal statement.

17. The apparatus in claim 1, wherein:
    said apparatus includes means for acknowledging that it has received said specified touch gesture pattern.

18. The apparatus of claim 17, wherein:
    said acknowledging means comprises an electronic device for producing a vocal statement indicating that said specified touch gesture pattern has been received by said apparatus.

19. The apparatus of claim 17, wherein:
    said acknowledging means comprises one or more vibrators mounted on said steering wheel, and further includes means for actuating said vibrators in response to receipt of said specified touch gesture pattern.

20. The apparatus of claim 19, wherein:
    one of said vibrators is placed adjacent to each of said touch pad devices on said steering wheel.

21. The apparatus of claim 20, wherein:
    one of said vibrators is placed underneath each of said touch pad devices on said steering wheel.

22. The apparatus of claim 17, wherein:
    said acknowledging means comprises a visual indicator, and further includes means for actuating said visual indicator in response to said receipt of said specified touch gesture pattern.

23. The apparatus of claim 22, wherein:
    said visual indicator comprises a light disposed to flash in a specified pattern in response to said specified touch gesture pattern.

24. The apparatus of claim 1, wherein:
    a comparator is provided to compare a command received from said interpretation module with the current status of a vehicle system associated with said command.

25. The apparatus of claim 1, wherein:
    a training module is connected to said interpretation module for use by said operator to enter operator selected touch gesture patterns, and commands respectively associated therewith, into said interpretation module.

26. The apparatus of claim 1, wherein:
said apparatus includes means for determining whether or not a set of received touch gestures has been provided by a person who is allowed to operate said motor vehicle.

27. A method for selectively controlling one or more systems included with a motor vehicle driven by a vehicle operator comprising the steps of:
applying a touch gesture pattern to one or more touch pad devices, while said vehicle is being driven, to generate a corresponding pattern of touch pad signals;
analyzing said corresponding pattern of touch pad signals to identify an associated pre-specified command for selectively operating a particular one of said systems;
generating a signal to operate said particular system in accordance with said associated pre-specified command; and
detecting occurrences of an extreme situation, and in response thereto causing said particular system to disregard any commands until said extreme situation has ended.

28. The method of claim 27, further including:
operating at least one device having a mode of operation different from the mode of operation of said touch pad devices to generate one or more multi-mode signals; and
executing said pre-specified command in response to both said corresponding pattern of touch pad signals, and a specified one of said multi-mode signals.

29. The method of claim 27, wherein:
said touch gesture pattern is applied to at least two of said touch pad devices mounted on the steering wheel of said vehicle.

30. The method of claim 27, wherein:
a feedback device is operated to request that said operator confirm an intent to generate and execute one of said commands.

31. Apparatus for selectively controlling one or more systems included with a motor vehicle having a steering wheel and driven by a vehicle operator, said apparatus comprising:
at least two touch pad devices respectively mounted on the steering wheel of said vehicle, wherein each touch pad receives at least one touch gesture from said operator to generate a specified pattern comprising multiple touch pad signals;
an interpretation module adapted to recognize that said specified pattern of touch pad signals is associated with a pre-specified command for selectively operating a particular one of said systems; and
an execution module disposed to receive said pre-specified command from said interpretation module, and to operate said particular system in accordance with said pre-specified command.

32. The apparatus of claim 31, wherein:
a training module is connected to said interpretation module for use by said operator to enter operator selected touch gesture patterns, and commands respectively associated therewith, into said interpretation module.

33. The apparatus of claim 31, wherein:
at least one device having a mode of operation different from the mode of operation of said touch pad devices is provided for use by said operator to generate one or more multi-mode signals; and
said interpretation module is disposed to route said pre-specified command to said execution module upon receiving both said specified pattern of touch pad signals, and a specified one of said multi-mode signals.

34. The apparatus of claim 31, wherein:
said apparatus includes means for detecting occurrences of an extreme situation and for causing said execution module to disregard any command until said apparatus is positively informed that said extreme situation has ended.

* * * * *